United States Patent
Giacomelli et al.

[19]

[11] Patent Number: 5,819,504
[45] Date of Patent: Oct. 13, 1998

[54] PROCESS AND APPARATUS FOR APPLYING FITMENTS TO A CARTON

[75] Inventors: Peter Giacomelli, Buffalo Grove; Kosaku Itoh, Arlington Heights, both of Ill.

[73] Assignee: Tetra Laval Holdings & Finance, S.A., Pully, Switzerland

[21] Appl. No.: 710,619

[22] Filed: Sep. 20, 1996

[51] Int. Cl.[6] .................................................. B65B 61/18
[52] U.S. Cl. ...................... 53/412; 53/DIG. 2; 53/133.2; 53/133.4; 493/87; 493/102; 493/213
[58] Field of Search ........................ 156/580.1, 580.2; 53/133.2, DIG. 2, 410, 412, 133.3, 133.4; 493/87, 102, 213

[56] References Cited

U.S. PATENT DOCUMENTS

| | | |
|---|---|---|
| 2,887,933 | 5/1959 | Bergstein et al. . |
| 4,507,168 | 3/1985 | Konaka . |
| 4,526,562 | 7/1985 | Knudsen et al. . |
| 4,676,709 | 6/1987 | Bonora et al. . |
| 4,734,142 | 3/1988 | Cresswell . |
| 4,788,811 | 12/1988 | Kawaijiri et al. . |
| 5,058,360 | 10/1991 | Yamazaki et al. ..................... 53/133.2 |
| 5,110,041 | 5/1992 | Keeler . |
| 5,169,374 | 12/1992 | Abrams et al. . |
| 5,219,320 | 6/1993 | Abrams et al. . |
| 5,267,934 | 12/1993 | Pape et al. . |
| 5,272,855 | 12/1993 | Togi et al. . |
| 5,304,265 | 4/1994 | Keeler . |
| 5,366,433 | 11/1994 | McCormick . |
| 5,429,699 | 7/1995 | Abrams et al. . |
| 5,435,803 | 7/1995 | Owen et al. . |
| 5,473,857 | 12/1995 | Keeler . |
| 5,480,502 | 1/1996 | Stewart et al. . |
| 5,484,374 | 1/1996 | Bachner et al. . |
| 5,601,669 | 2/1997 | Moody et al. ............................ 493/87 |

FOREIGN PATENT DOCUMENTS

| | | | |
|---|---|---|---|
| 0296632 | 12/1990 | Japan ..................................... | 53/133.2 |
| 0600305 | 10/1994 | Japan ..................................... | 53/133.2 |

*Primary Examiner*—Daniel Moon
*Assistant Examiner*—Gene L. Kim
*Attorney, Agent, or Firm*—Michael A. Catania

[57] ABSTRACT

The present invention may be utilized as a single station integrated with a standard form, fill and seal machine. The present invention is able to retrieve fitments from a source, apply the fitments to a container and seal the fitments to the container at a single station. The design of the present invention requires only minimal space on a form, fill and seal machine. In practicing the present invention, an anvil retrieves a fitment from a source and then translationally retreats to a position for longitudinal descent into a container. The anvil, with the fitment attached, longitudinally descends into the container to a position parallel to an incision previously incised into the container wall. The anvil proceeds forward to the incision, substantially recovering the translational retreat discussed above, only at a lower level. Once the fitment is positioned therethrough the incision, a sealer permanently attaches the fitment to the container. The anvil then retreats to a position for longitudinal ascent and the container proceeds to the next station. The process is repeated for subsequent containers. By inserting and sealing a fitment to a container at a single station, the present invention is able to substantially diminish any opportunities for the fitment becoming disengaged from the container prior to sealing of the fitment to the container.

12 Claims, 7 Drawing Sheets

PROCESS AND APPARATUS FOR APPLYING FITMENTS TO A CARTON

TECHNICAL FIELD

The present invention relates to a process and apparatus for applying fitments to a container. Specifically, the present invention relates to a process and apparatus for applying fitments to a gabled top carton.

BACKGROUND

Forming, filling and sealing machines have been used for decades in the food packaging industry to package items such as milk for distribution to retail outlets such as grocery stores. Generally these machines are fed a paperboard sheet laminated with heat-sealable plastic which is formed to a container configuration, filled with a specific contents and then sealed for distribution elsewhere. A gabled top milk carton is a specific example of the containers formed, filled and sealed by these machines.

Previously, the contents of these containers were dispensed by tearing open one side of the top of the carton to form a pourable spout. However once open, the carton was unable to be tightly resealed to prevent spillage of the contents or the ingress or egress of gases. To alleviate these problems, the packaging industry devised a new generation of cartons integrated with fitments in order to dispense the contents in a resealable manner. This has forced the packaging industry to either design completely new forming, filling and sealing machines to accommodate the application of the fitment with the container, or design a fitment applicator as an add-on component for existing machines.

Most of the fitment applicators were designed to place the fitment in a pre-cut hole of the container at one station in the machine and then to attach the fitment to the container through ultrasound, heat or the like at another station in the machine. One clearly apparent disadvantage of such a dual station fitment applicator is the space requirement for two additional stations on an already crowded forming, filling and sealing machine. Another critical disadvantage to dual station fitment applicators is the potential for displacement of the fitment from the container during transportation from the insertion station to the attachment station. Still another critical disadvantage to dual station fitment applicators is the necessity to index the conveyance of the containers to two additional stations. Recent fitment applicators have attempted to respond to some of these disadvantages, however, there is still a need for a fitment applicator which alleviates all of the disadvantages of the dual station applicators.

SUMMARY OF THE INVENTION

The present invention provides a fitment applicator that meets the unfulfilled needs for form, fill and seal machines. The present invention is able to accomplish this by providing a single station fitment applicator which requires a minimum of space to apply a fitment to a carton being conveyed along a form, fill and seal machine.

One embodiment of the present invention is a method for applying a fitment to a container having an open end and an incision therein. The first step of the general method is to place an anvil having the fitment engaged thereon longitudinally into the container through the open end until the fitment is aligned with the incision. The next step involves moving the anvil translationally until the fitment is inserted through the incision. The final step is affixing the fitment to the container before substantial disengagement of the fitment from the anvil. The method may also comprise the step of engaging the fitment to the anvil prior to the step of placing the anvil into the container. The method may also comprise the step of reversing the movement of the anvil subsequent to the step of affixing the fitment to the container. The step of affixing the fitment to the container may be accomplished by ultrasonically welding the fitment to the container. The container utilized in the method may be a partially formed gabled top carton. The method of the present invention may be utilized within a system to form, fill and seal containers. The step of placing the anvil into the container may occur along a longitudinal axis without substantial translational movement of the anvil as it is placed into the container. The step of placing the anvil into the container may occur along a longitudinal arc without substantial translational movement of the anvil as it is placed into the container. The method may further comprise the step of moving the anvil translationally to a position for longitudinal oscillation of the anvil subsequent to the step of engaging the fitment and prior to the step of placing the anvil into the container. The container utilized with the present invention may be a gabled top carton. The application of the fitment to the container by the apparatus may be apparatus may be indexed to a conveyance of containers along a form, fill and seal machine.

Having briefly described this invention, the above and further objects, features and advantages thereof will be recognized by those skilled in the in the pertinent art from the following detailed description of the invention when taken in conjunction with the accompanying drawings.

BRIEF DESCRIPTION OF THE DRAWINGS

Several features of the present invention are further described in connection with the accompanying drawings in which:

There is illustrated in FIG. 1 a side view of one embodiment of an apparatus of the present invention.

Figure 1:
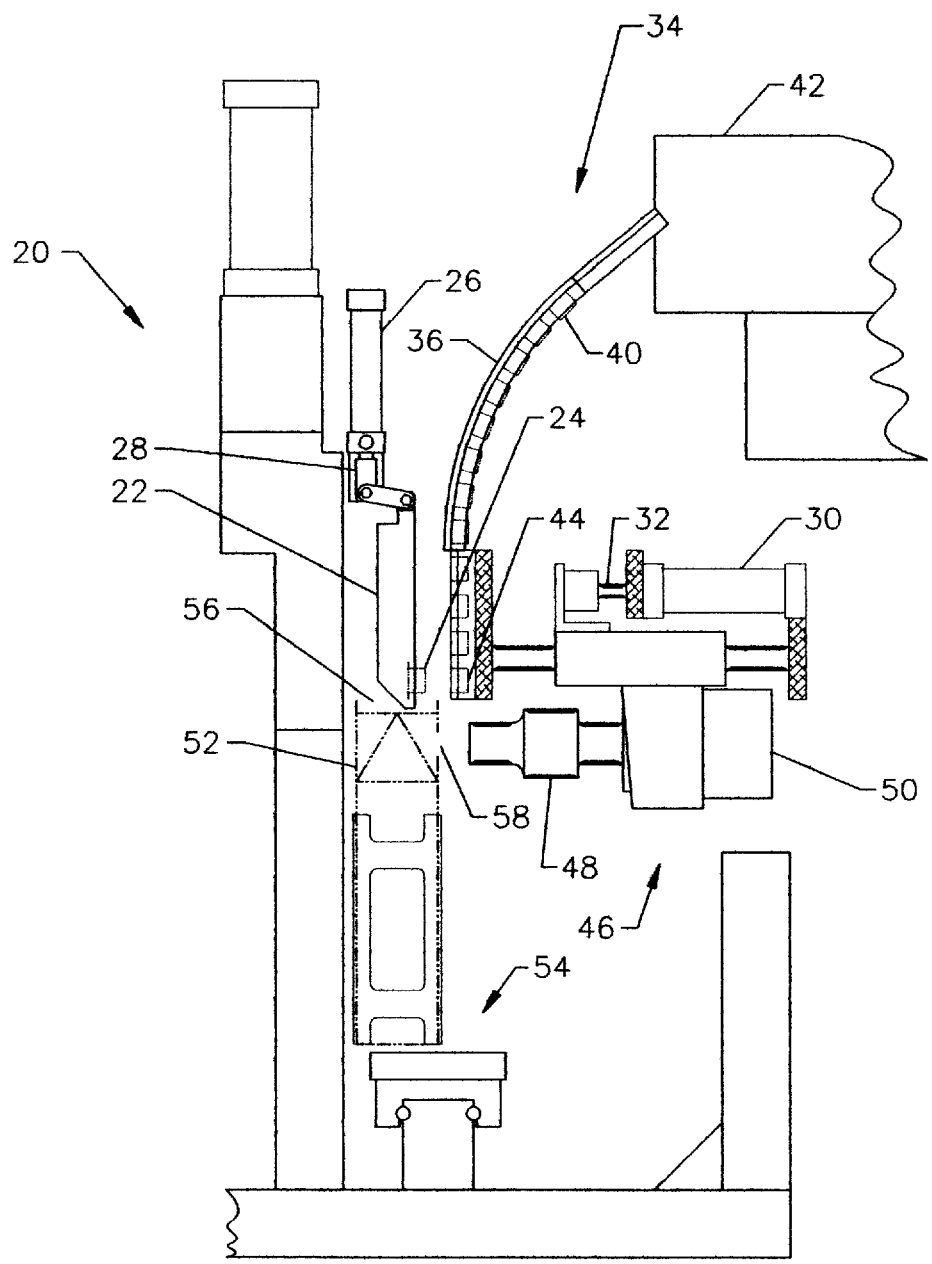
Figure 2A:
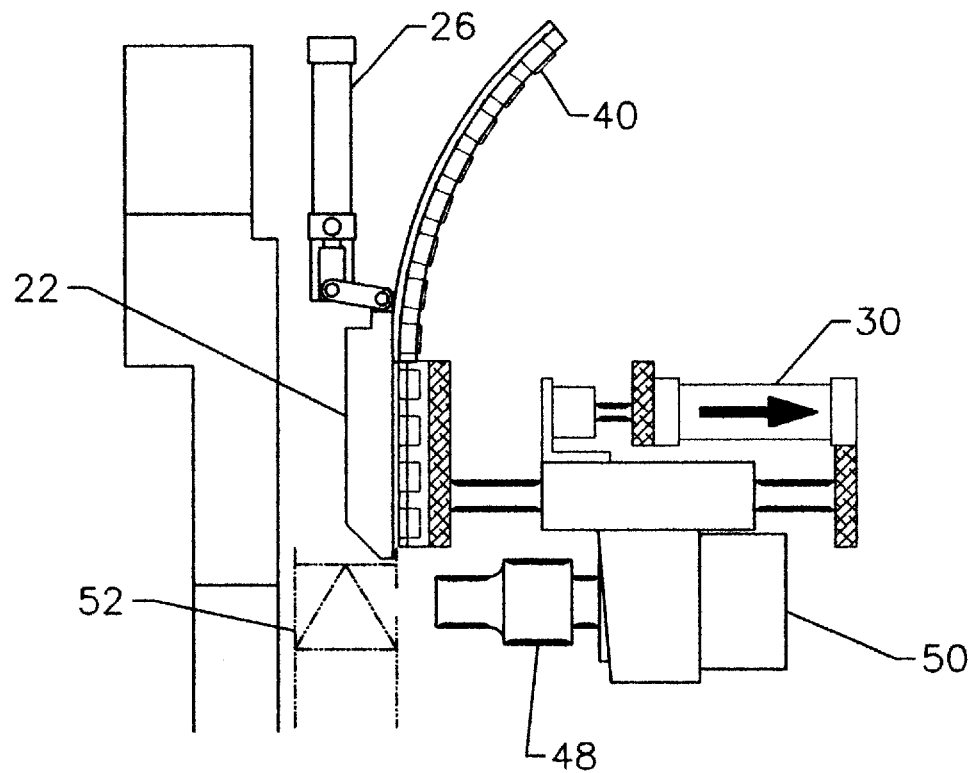

There is illustrated in FIG. 2A a side view of the apparatus of FIG. 1 at a first point in time.

Figure 2B:
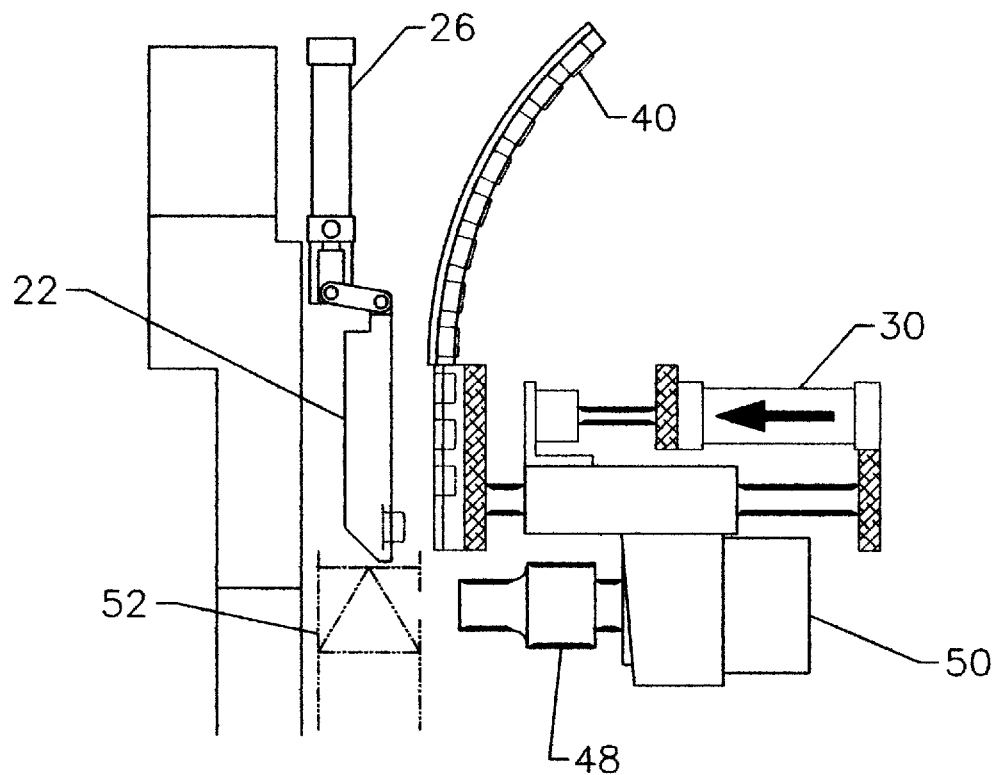

There is illustrated in FIG. 2B a side view of the apparatus of FIG. 1 at a second point in time.

Figure 2C:
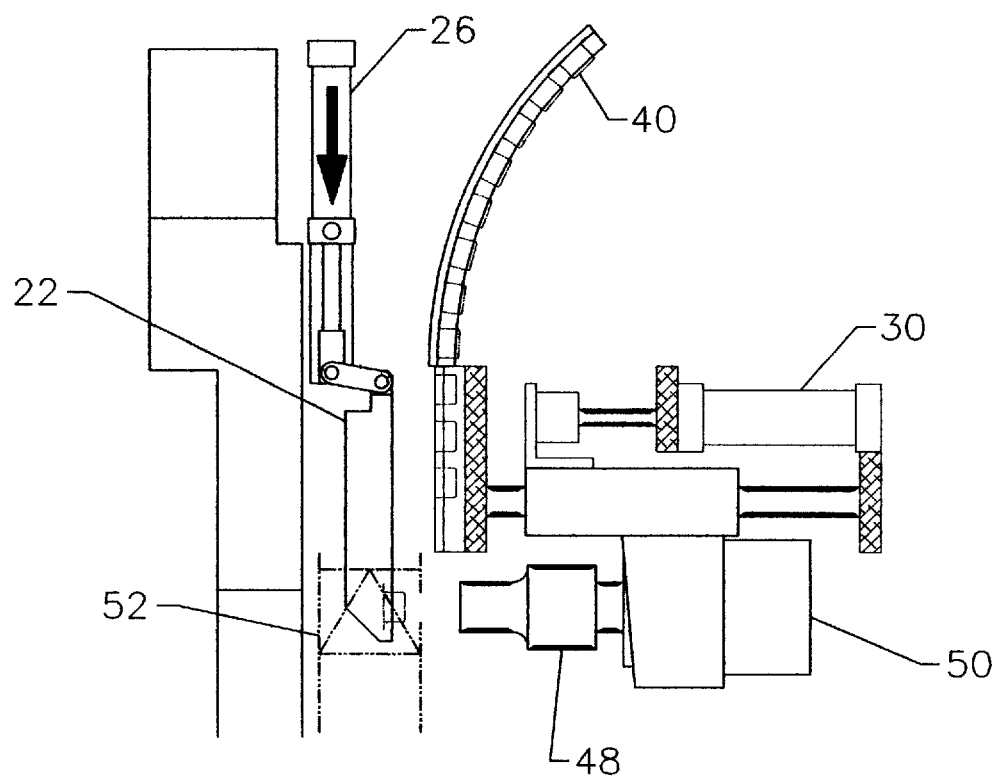

There is illustrated in FIG. 2C a side view of the apparatus of FIG. 1 at a third point in time.

Figure 2D:
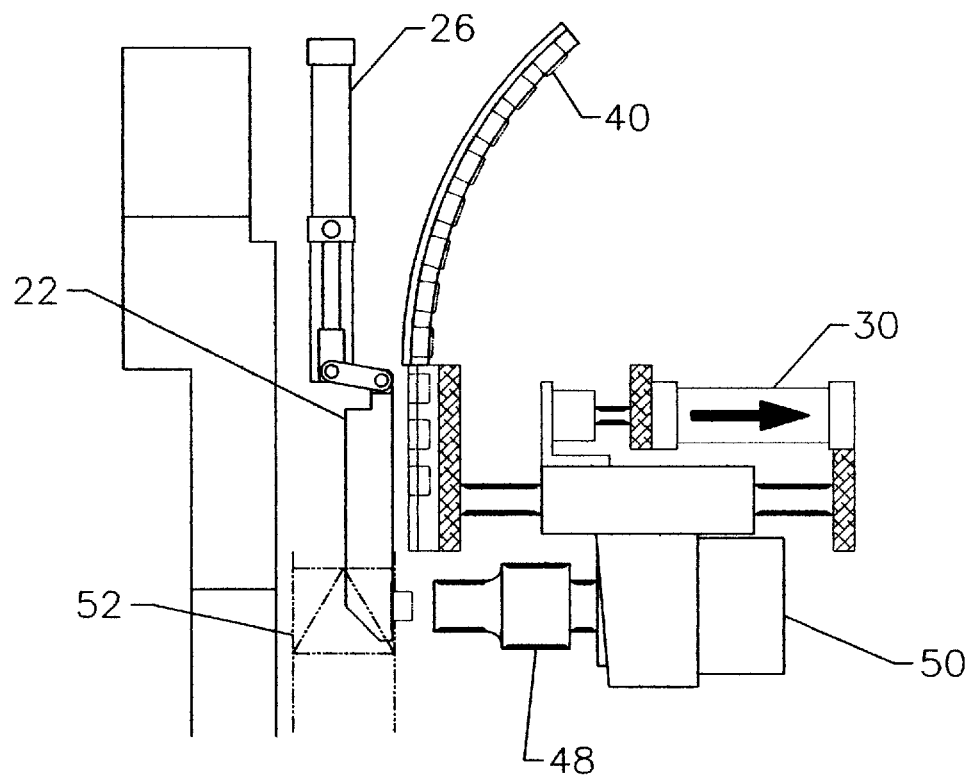

There is illustrated in FIG. 2D a side view of the apparatus of FIG. 1 at a fourth point in time.

Figure 2E:
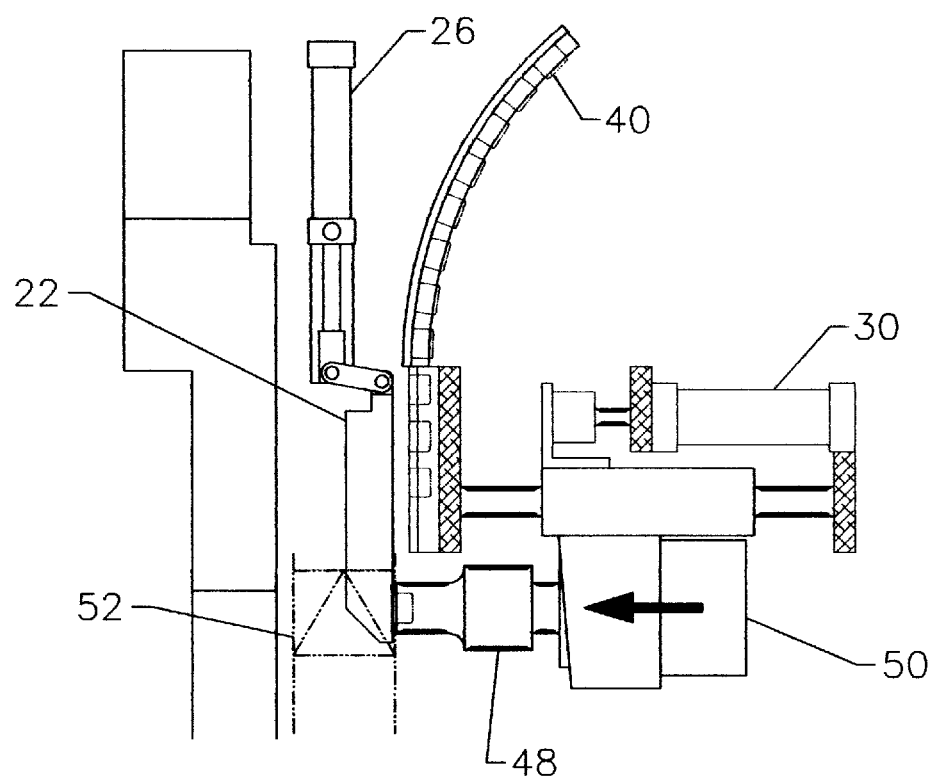

There is illustrated in FIG. 2E a side view of the apparatus of FIG. 1 at a fifth point in time.

Figure 2F:
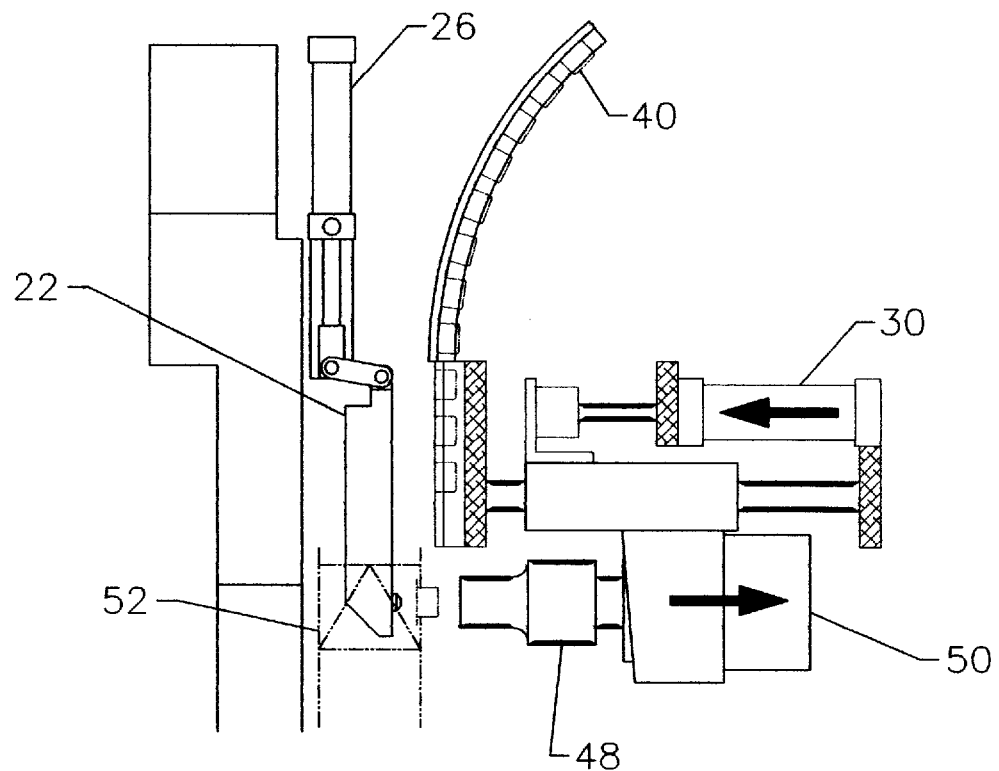

There is illustrated in FIG. 2F a side view of the apparatus of FIG. 1 at a sixth point in time.

DETAILED DESCRIPTION OF THE PREFERRED EMBODIMENTS

The present invention is designed to be a component of a form, fill and seal machine whether as an integrated component of a new machine or as an add-on component to an existing machine. However, those skilled in the pertinent art will recognize possible applications of the present invention other than those mentioned above.

In utilization with a form, fill and seal machine, the present invention is preferably positioned between the partial forming of a container and the filling of such container on the form, fill and seal machine. The present invention has been designed to minimize both time and space in utilization with a form, fill and seal machine. To accomplish the minimization of time and space, the present invention has been designed for minimal translational movement and longitudinal oscillation of an anvil which transports a fitment from a fitment dispenser to a container for attachment thereon in a continual process indexed to the conveyance of containers along a conveyor belt of a form, fill and seal machine.

There is illustrated in FIG. 1 a side view of one embodiment of an apparatus of the present invention. Referring to FIG. 1, the fitment applicator of the present invention is generally designated 20. The applicator 20 has an anvil 22 which is capable of translational movement and longitudinal oscillation. In this embodiment, the longitudinal oscillation is along a longitudinal axis. The anvil 22 has a fitment engagement means 24 protruding from one surface of the anvil 22. The anvil 22 is attached from above to a first drive source 26 by a first lever 28. The first drive source 26 provides for the longitudinal movement of the anvil 22 from a first horizontal plane to a second horizontal plane. Translational movement of the anvil is accomplished by a second drive source 30 which is attached to the anvil 22 by a second lever 32. The anvil 22 may be moved along a horizontal plane from a forward position to a longitudinal pathway position. The movement of the anvil 22 will more thoroughly be described in FIGS. 2A–F.

Still referring to FIG. 1, a fitment dispenser is generally designated 34. The fitment dispenser 34 is composed of a chute 36 which transports fitments 40 from a fitments feeder 42, not shown, to an engagement point 44 at one end of the chute 36 and also located on the first horizontal plane. A fitment 40 placed in the engagement point 44 is positioned to be engaged by the fitment engagement means 24.

An ultrasonic sealer is generally designated 46. The ultrasonic sealer 46 consists of a sonotrode 48 and a converter 50. Means for sealing the fitment 40 to the container 52 may be an ultrasonic sealer 46 or other sealing devices such as a heater for heat sealable lamination. The ultrasonic sealer 46 is capable of linear movement toward and away from a container 52 to be attached with a fitment 40. The container 52 is conveyed to a position below the fitment applicator 20 by a conveyor belt 54. The container 52 is partially constructed and has an open end 56 for placement of the anvil 22 therethrough. The container 52 has an incision 58 which has been cut into the container 52 for placement of a fitment therethrough. The fitment 40 has a flanged end which is positioned against the interior walls of the container 52 while the sprout protrudes through the incision 56. The ultrasonic sealer 46 is horizontally aligned with the incision 58 of the container 52 for temporary engagement of the ultrasonic sealer 46 with the fitment 40 when it is inserted through the incision 56 of the container 52.

There is illustrated in FIG. 2A a side view of the apparatus of FIG. 1 at a first point in time. Referring to FIG. 2A, the anvil 22 is at an engagement position along the first horizontal plane. The fitment engagement means 24 is engaged with a fitment 40 at the engagement point 44. At this engagement stage, the ultrasonic sealer 46 is in its resting position. The protrusion which is the fitment engagement means 24 couples with the cavity 45 formed by the spout and cap of the fitment 40. In this manner, the fitment 40 is firmly but not permanently attached to the fitment engagement means 44 which allows for the transport of the fitment 40 from the fitment dispenser 34 to the container 52.

There is illustrated in FIG. 2B a side view of the apparatus of FIG. 1 at a second point in time. Referring to FIG. 2B, the anvil 22 has retracted from the engagement point 44 in a translational motion along a first horizontal plane. The anvil 22 is also positioned on a longitudinal pathway for descent through the open end of the container 52. The time and space saving features of the present invention are apparent from the minimal distance the anvil 22 retracts from the engagement point which is only several centimeters. Also, the potential for disengagement of the fitment 40 before the fitment 40 is inserted through the incision 56 of the container 52 is greatly decreased by designing an applicator 20 with an anvil 22 that transports a fitment 40 such minimal distances.

Still referring to FIG. 2B, a new fitment 40 assumes the position of the previous fitment 40 at the engagement point 44 in the fitment dispenser 34. Subsequently, an orderly downward movement of the fitments 40 in the chute 36 of the fitment dispenser 34 occurs due to gravitational forces. In this manner, subsequent fitments 40 are prepared for engagement with the fitment engagement means 24.

There is illustrated in FIG. 2C a side view of the apparatus of FIG. 1 at a third point in time. Referring to FIG. 2C, the first drive source 26 has lowered the anvil 22 through the open end of the container 52 and into the interior of the container 52 to a position parallel to the incision 56 along a second horizontal plane. The anvil is lowered along the longitudinal pathway with substantially no translational movement. As generally discussed above, the time and space saving features of the present invention are apparent from the minimal distances the anvil 22 is moved, in this situation along a longitudinal pathway as opposed to the previously mentioned translational movement. Also, as previously mentioned, the potential for the disengagement of the fitment 40 is greatly decreased by having to travel only minimal distances.

Still referring to FIG. 2C, the longitudinal pathway the anvil 22 descends along into the container 52 from a first horizontal plane to a second horizontal plane should be a sufficient distance removed from the wall of the container 52 to prevent any interference from the container 52 with the longitudinal movement of the anvil 22. The distance from the wall of the container 52 should also account for the added length of the fitment 40 attached to the fitment engagement means 24. The unobstructed longitudinal movement of the anvil 22 ensures that the fitment 40 will not be dislodged from the fitment engagement means 24 until insertion into the incision 56.

There is illustrated in FIG. 2D a side view of the apparatus of FIG. 1 at a fourth point in time. Referring to FIG. 2D, the anvil 22 has inserted the fitment 40 into the incision 56 of the container 52 at an attachment point 58. The translational movement of the anvil 22 toward the incision 56 along the second horizontal plane is accomplished by the second drive source 30. The anvil 22 is moved forward until the flange of the fitment 40 rests firmly against the wall of the container 52 with spout and cap of the fitment 40 protruding through the incision 56. Once the fitment 40 is in this position, it is ready for permanent attachment to the container 52. The distance the anvil 22 travels from the longitudinal pathway position, as shown in FIG. 2C, to the attachment point 58 along the second horizontal plane is substantially equal to the distance the anvil 22 travels from the engagement point 44, as shown in FIG. 2A, rearward to the longitudinal pathway position, as shown in FIG. 2B, along the first horizontal plane. In this manner, the space for the applicator 20 is minimized by designing substantially equal translational distances for the anvil 22. The design also allows for the simplification of the programming of the second drive source 30 in that only translational movement from one position to a second position is needed by the second drive source 30.

Still referring to FIG. 2D, the ultrasonic horn 46 is positioned along the second horizontal plane parallel to the fitment 40 which now protrudes from the container 52. The ultrasonic sealer 46 rests at a sufficient distance from the fitment 40 which allows for the fitment 40 to protrude from the container 52 while the flange of the fitment 40 rests firmly against the wall of the container 52. If the ultrasonic sealer 46 is too close to the fitment 40, then the fitment 40 may become dislodged prior to complete insertion into the incision 56.

There is illustrated in FIG. 2E a side view of the apparatus of FIG. 1 at a fifth point in time. Referring to FIG. 2E, the ultrasonic sealer 46 is now positioned firmly against the exterior of the wall of the container 52 and also encompassing the spout and cap of the fitment 40. Specifically, the sonotrode 48 of the ultrasonic sealer 46 encompasses the spout and cap of the fitment 40 in an aperture 60, not shown. The ultrasonic sealer 46 moves only a minimal distance along the second horizontal plane from its resting position to an activation position as illustrated in FIG. 2E. The translational movement of the ultrasonic sealer 46 is accomplished by a third drive source 62. Similar to the anvil 22, the time and space saving features of the present invention are apparent from the minimal distance that the ultrasonic sealer 46 travels from the resting position to the activation position.

Once at the activation position, the ultrasonic sealer 46 generates an ultrasonic sound which vibrates for a predetermined time and at a frequency sufficient to weld the flange of the fitment 40 to the interior of the wall of the container 52. The flange of the fitment 40 is buttressed by the anvil 22 which has sufficient inertia to allow for the proper welding of the flange of the fitment 40 to the wall of the container 52. If the anvil 22 does not possess sufficient inertia, then the fitment 40 might not be completely welded to the container 52, or the cap might be welded to the spout of the fitment 40. Once the fitment 40 is properly welded to the container 52, the anvil 22 is ready for retraction from the attachment position to the longitudinal pathway position along the second horizontal plane.

There is illustrated in FIG. 2F a side view of the apparatus of FIG. 1 at a sixth point in time. Referring to FIG. 2F, the anvil 22 has retracted to the longitudinal pathway position thereby disengaging the fitment 40, which is now welded to the container 52, from the fitment engagement means 24. The anvil 22 is now prepared for ascension along the longitudinal pathway from the second horizontal plane to the first horizontal plane. Once the anvil 22 is removed from the interior of the container 52, the container 52 is conveyed down the line to another station on the form, fill and seal machine. A subsequent container 52 will then take its place at the applicator 20.

Still referring to FIG. 2F, the ultrasonic sealer 46 has been retracted along the second horizontal plane to its resting position from the activation position. The retraction of the ultrasonic sealer 46 is accomplished by the third driving source 62. The resting position of the ultrasonic sealer 46 provides sufficient distance from the newly welded fitment 40 to allow for the unobstructed conveyance of the container 52 to the next station on the form, fill and seal machine. The anvil 22 then ascends along the longitudinal pathway to the first horizontal plane, as shown in FIG. 1. The process is then repeated for each container 52 which is transported along the conveyor belt 54 to the applicator 20.

There is illustrated in FIG. 3 a side view of an alternative embodiment of the present invention. Referring to FIG. 3, the applicator 20 generally consists of an anvil 22, a fitment dispenser 34, an ultrasonic sealer 46, an oscillating arm 70 and drive sources 26, 30 and 76. Similar to the embodiment disclosed in FIG. 1, the applicator 20 is positioned above the conveyor belt 54 of a form, fill and seal machine. The container 52 has been partially formed and incised with an incision appropriate to the fitment 40 at previous stations on the form, fill and seal machine.

The anvil 22 is connected to the oscillating arm 70 in such a manner as to allow for movement of the anvil 22 with the oscillating arm 70 acting as a guide. The anvil 22 is capable of translational movement as well as longitudinal oscillation. In this embodiment, the longitudinal oscillation of the anvil involves descending and ascending along a longitudinal arc designated 78. Also connected to the oscillating arm 70 is the second drive source 30 which may be a compression spring and a cam block which is connected to a cylinder. The second drive source 30 allows for the translational movement of the anvil 22. The oscillating arm 70 is hinged to the first drive source 26 which allows for the oscillation of the oscillating arm 70. The first drive source 26 may be a pneumatic cylinder which controls the movement of the oscillating arm 70 by extending and retracting its piston. The ascending motion of the oscillating arm 70 is limited by a first block 72 at approximately a 30 degree angle to the conveyor belt 54, and the descending motion of the oscillating arm 70 is limited by a second block 74 which is substantially parallel to the conveyor belt 54. The limit of ascending motion of the oscillating arm 70 defines a first level on which the translational movement of the anvil 22 occurs, and the limit of the descending motion of the oscillating arm 70 defines a second level on which the translational movement of the anvil 22 occurs in this embodiment. The oscillating motion of the oscillating arm 70 also provides for the descending and ascending motion of the anvil 22.

The anvil 22 has a fitment engagement means 24 for engagement of the fitments 40 from the fitment dispenser 34. The fitment dispenser 34 has a chute 36 which transfers fitments 40 from a fitments feeder 42, not shown, at one end of the chute 36 to an engagement point 44 at the other end of the chute 36. The fitment dispenser 34 is substantially perpendicular to the oscillating arm 70 when the oscillating arm 70 is at the limit of its ascending motion along the longitudinal arc 78.

As mentioned above, the applicator 20 is positioned above the conveyor belt 54 which transports containers 52 throughout various stations on the form, fill and seal machine, including the applicator station. A container 52 is positioned at the applicator 20 so as to allow for the unobstructed descension of the anvil 22 into the interior of the container 52 while a fitment 40 is engaged on the fitment engagement means 24.

There is illustrated in FIG. 4A a side view of the apparatus of FIG. 3 at a first point in time. Referring to FIG. 4A, the anvil 22 has moved in a translational motion along the first level toward the fitment dispenser 34 thereby allowing for engagement of a fitment 40 with the fitment engagement means 24. The anvil 22 has moved a minimal distance from its previous position of FIG. 3. The translational movement is accomplished by the second drive source 30 which provides for the forward movement of the anvil 22 to the fitment dispenser 34. Once at the fitment dispenser 34, the fitment engagement means 24 engages with a fitment 40 at the engagement point 44. The fitment engagement means 24 may be a lobe protruding from one surface of the anvil 22 wherein the lobe is sized to couple with the aperture 60 of the fitment 40. The lobe engages with a fitment aperture 80, not shown, in such a manner as to provide for the secure transport of the fitment 40 from the fitment dispenser 34 to the incision 56 of the container 52 which occurs at the second level.

There is illustrated in FIG. 4B a side view of the apparatus of FIG. 3 at a second point in time. Referring to FIG. 4B, the anvil 22 has retracted from the engagement point 44 in a translational motion along the first level. The anvil 22 is also positioned on the arc 76 for descent through the open end of the container 52. The time and space saving features of the present invention are apparent from the minimal distance the anvil 225 retracts from the engagement point which is only several centimeters. Also, the potential for disengagement of the fitment 40 before the fitment 40 is inserted through the incision 56 of the container 52 is greatly decreased by designing an applicator 20 with an anvil 22 that transports a fitment 40 such minimal distances.

There is illustrated in FIG. 4C a side view of the apparatus of FIG. 3 at a third point in time. Referring to FIG. 4C, the first drive source 26 has lowered the oscillating arm 70 thereby lowering the anvil 22 through the open end of the container 52 and into the interior of the container 52 to a position parallel to the incision 56 along the second level. The anvil 22 is lowered along the longitudinal arc 78 with substantially no translational movement. As generally discussed above, the time and space saving features of the present invention are apparent from the short distances the anvil 22 is moved, in this situation along the longitudinal arc 78 as opposed to the translational movement previously mentioned in the discussion of FIG. 4B. Also, as previously mentioned, the potential for the disengagement of the fitment 40 is greatly decreased by having to travel only minimal distances along the longitudinal arc 78.

Still referring to FIG. 4C, the longitudinal arc 78 the anvil 22 descends along into the container 52 from the first level to a second level should be a sufficient distance from the wall of the container 52 to prevent any interference from the container 52 with the longitudinal oscillation of the anvil 22. The distance from the wall of the container 52 should also account for the added length of the fitment 40 attached to the fitment engagement means 24. The unobstructed longitudinal oscillation of the anvil 22 ensures that the fitment 40 will not be dislodged from the fitment engagement means 24 until insertion into the incision 56.

The ultrasonic sealer 46 is positioned along the second level parallel to the incision 56 of the container 52. The ultrasonic sealer 46 rests at a sufficient distance from the incision 56 which allows for the fitment 40 to protrude from the container 52 while the flange of the fitment 40 rests firmly against the wall of the container 52. If the ultrasonic sealer 46 is too close to the fitment 40, then the fitment 40 may become dislodged prior to complete insertion into the incision 56.

Still referring to FIG. 4C, a new fitment 40 assumes the position of the previous fitment 40 at the engagement point 44 in the fitment dispenser 34. Subsequently, an orderly downward movement of the fitments 40 in the chute 36 of the fitment dispenser 34 occurs due to gravitational forces. In this manner, subsequent fitments 40 are prepared for engagement with the fitment engagement means 24.

There is illustrated in FIG. 4D a side view of the apparatus of FIG. 3 at a fourth point in time. Referring to FIG. 4D, the anvil 22 has inserted the fitment 40 into the incision 56 of the container 52 at an attachment point 58. The translational movement of the anvil 22 toward the incision 56 along the second level is accomplished by the second drive source 30.

The anvil 22 is moved forward until the flange of the fitment 40 rests firmly against the wall of the container 52 with spout and cap of the fitment 40 protruding through the incision 56. Once the fitment 40 is in this position, it is ready for permanent attachment to the container 52. The distance the anvil 22 travels from the longitudinal arc position, as shown in FIG. 4C, to the attachment point 58 along the second level is substantially equal to the distance the anvil 22 travels from the engagement point 44, as shown in FIG. 4A, rearward to the longitudinal arc position, as shown in FIG. 4B, along the first level. In this manner, the space for the applicator 20 is minimized by designing substantially equal translational distances for the anvil 22. The design also allows for the simplification of the programming of the second drive source 30 in that only translational movement from one position to a second position is needed by the second drive source 30.

Still referring to FIG. 4D, the ultrasonic welder 46 is now positioned firmly against the exterior of the wall of the container 52 and also encompassing the spout and cap of the fitment 40. Specifically, the sonotrode 48 of the ultrasonic sealer 46 encompasses the spout and cap of the fitment 40 in the aperture 60, not shown. The ultrasonic sealer 46 moves only a minimal distance along the second level from its resting position to an activation position as illustrated in FIG. 4D. The translational movement of the ultrasonic sealer 46 is accomplished by a third drive source 76, not shown. Similar to the anvil 22, the time and space saving features of the present invention are apparent from the minimal distance that the ultrasonic sealer 46 travels from the resting position to the activation position.

Once at the activation position, the ultrasonic sealer 46 generates an ultrasonic sound which vibrates for a predetermined time and at a frequency sufficient to weld the flange of the fitment 40 to the interior of the wall of the container 52. The flange of the fitment 40 is buttressed by the anvil 22 which has sufficient inertia to allow for the proper welding of the flange of the fitment 40 to the wall of the container 52. If the anvil 22 does not possess sufficient inertia, then the fitment 40 might not be completely welded to the container 52, or the cap might be welded to the spout of the fitment 40. Once the fitment 40 is properly welded to the container 52, the anvil 22 is ready for retraction from the attachment position to the longitudinal arc position along the second level.

There is illustrated in FIG. 4E a side view of the apparatus of FIG. 3 at a fifth point in time. Referring to FIG. 4E, the anvil 22 has retracted to the longitudinal arc position thereby disengaging the fitment 40, which is now welded to the container 52, from the fitment engagement means 24. The anvil 22 is now prepared for ascencion along the longitudinal arc from the second level to the first level. Once the anvil 22 is removed from the interior of the container 52, the container 52 is conveyed down the line to another station on the form, fill and seal machine. A subsequent container 52 will then take its place at the applicator 20.

Still referring to FIG. 4E, the ultrasonic sealer 46 has been retracted along the second level to its resting position from the activation position. The retraction of the ultrasonic sealer 46 is accomplished by the third driving source 76, not shown. The resting position of the ultrasonic sealer 46 provides sufficient distance from the newly welded fitment 40 to allow for the unobstructed conveyance of the container 52 to the next station on the form, fill and seal machine. The anvil 22 then ascends along the longitudinal arc 78 to the first level, as shown in FIG. 3, by raising the oscillating arm 70. The process is then repeated for each container 52 which is transported along the conveyor belt 54 to the applicator 20.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for applying fitments to a series of containers being conveyed along a form, fill and seal packaging machine, the application of the fitments occurring at a single station on a multiple station form, fill and seal packaging machine, each of the containers having an open end and a pre-incised hole for receiving the fitment therein, the method comprising the following steps:

dispensing a fitment from a fitment dispenser to an engagement position;

moving an anvil having a fitment engagement means toward the engagement position linearly along a first level defined by a horizontal plane, the engagement position lying on the first level;

engaging the fitment onto the fitment engagement means of the anvil;

moving the anvil linearly along the first level to a vertical movement position;

moving the anvil having the fitment engaged thereon from the first level to a second level through the open end of the container along a vertical line perpendicular to the conveyance of the series of containers, the second level defined by a second horizontal plane aligned with the pre-incised hole;

moving the anvil and linearly along the second level until the fitment is inserted through the pre-incised hole; and affixing the fitment to the container before substantial disengagement of the fitment from the anvil.

2. The method for applying a fitment to a container according to claim 1 further comprising the step of reversing the movement of the anvil subsequent to the step of affixing the fitment to the container.

3. The method for applying a fitment to a container according to claim 1 wherein the step of affixing the fitment to the container is accomplished by ultrasonically welding the fitment to the container.

4. The method for applying a fitment to a container according to claim 1 wherein the container is a partially formed gabled top carton.

5. An apparatus for applying fitments to a series of containers being conveyed along a form, fill and seal packaging machine, the apparatus positioned at a single station of a multiple station form, fill and seal packaging machine, each of the containers having an open end and a pre-incised hole for receiving the fitment therein, the apparatus comprising:

a fitment dispenser containing a plurality of fitments for engagement with a fitment engagement means, the fitment dispenser lying on a first level, the first level defined by a horizontal plane parallel to the line of conveyance, the fitment dispenser within the single station;

means for sealing the fitment to the container, the means for sealing lying on a second level, the second level defined by a second horizontal plane, the second horizontal plane aligned with the pre-incised hole, the sealing means within the single station;

an anvil having the fitment engagement means protruding therefrom, the anvil capable of vertical movement between at least the first level and the second level along a line perpendicular to the conveyance of the series of containers, and also capable of translational linear movement at the first level to retrieve a fitment from the fitment dispenser and at the second level to place the fitment through the pre-incised hole and seal the fitment onto the container, the anvil within the single station;

a drive source connected to the anvil, the drive source providing vertical movement of the anvil between the first level and the second level, and also providing translational linear movement of the anvil between the fitment dispenser and a vertical movement positions, and translational linear movement of the anvil between the means for sealing and the vertical movement position, the drive source within the single station.

6. The apparatus according to claim 5 wherein the means for sealing is an ultrasonic welding device.

7. The apparatus according to claim 5 wherein the fitment engagement means is a lobe which engages the fitment for transport from the fitment dispenser to insertion into the incision of the container.

8. The apparatus according to claim 5 wherein the drive source further comprises a first drive source for vertical movement and a second drive source for translational movement.

9. The apparatus according to claim 8 further comprising a third drive source for the translational movement of the means for sealing.

10. The apparatus according to claim 5 wherein the fitment dispenser is a chute terminating on one end at the first level and at a fitments feeder on an opposite end.

11. The apparatus according to claim 5 wherein the container is a gabled top carton.

12. The apparatus according to claim 5 wherein the applying of the fitment to the container by the apparatus is indexed to the conveyance of containers along the form, fill and seal machine.

* * * * *

UNITED STATES PATENT AND TRADEMARK OFFICE
CERTIFICATE OF CORRECTION

PATENT NO. : 5,819,504
DATED : October 13, 1998
INVENTOR(S) : Giacomelli et al.

It is certified that error appears in the above-identified patent and that said Letters Patent is hereby corrected as shown below:

<u>Title page,</u>
Item [75], Inventors, should read:

-- Peter Giacomelli, Buffalo Grove;
  Kosaku Itoh, Arlington Heights, both of Ill.
  Hisami Mistuishi, Blaine, MN --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 5,819,504
DATED          : October 13, 1998
INVENTOR(S)    : Giacomelli et al.

It is certified that error appears in the above-identified patent and that said Letters Patent is hereby corrected as shown below:

<u>Title page,</u>
Item [75], Inventors, should read:

-- Peter Giacomelli, Buffalo Grove;
  Kosaku Itoh, Arlington Heights, both of Ill.
  Hisami Mitsuishi, Blaine, MN --

This certificate supersedes Certificate of Correction issued April 6, 2004.

Signed and Sealed this

Fourteenth Day of September, 2004

JON W. DUDAS
*Director of the United States Patent and Trademark Office*